United States Patent
Fehr et al.

[11] Patent Number: 6,065,261
[45] Date of Patent: May 23, 2000

[54] CONSTRUCTION USING EXTRUDED SECTIONS AND COMPOSITE PANELS

[75] Inventors: Peter Fehr, Hettlingen; Roger Betschart, Weiningen; Robert J. Dean, Uhwiesen; Lutz Kampmann, Beringen; Andreas Von Ballmoos, Ennetmoos, all of Switzerland

[73] Assignee: Alusuisse Technology & Management Ltd., Neuhausen am Rheinfall, Switzerland

[21] Appl. No.: 09/118,677

[22] Filed: Jul. 17, 1998

[30] Foreign Application Priority Data

Jul. 17, 1997 [EP] European Pat. Off. ............. 97810505

[51] Int. Cl.⁷ .................. E04B 1/38; B61D 17/04
[52] U.S. Cl. ............... 52/580; 52/223.1; 52/582.1; 52/588.1; 52/747.1; 105/401; 105/409
[58] Field of Search ................. 52/223.1, 309.9, 52/578, 580, 582.1, 588.1, 747.1, 794.1, 797.1, 800.1; 105/401, 409

[56] References Cited

U.S. PATENT DOCUMENTS

| | | | |
|---|---|---|---|
| 5,042,395 | 8/1991 | Wackerle et al. | 105/397 |
| 5,140,913 | 8/1992 | Takeichi et al. | 105/397 |
| 5,218,792 | 6/1993 | Cooper | 52/309.9 X |
| 5,403,062 | 4/1995 | Sjostedt et al. | 296/181 |
| 5,403,063 | 4/1995 | Sjostedt et al. | 296/187 |
| 5,433,151 | 7/1995 | Ohara et al. | 105/397 |
| 5,595,123 | 1/1997 | Tao et al. | 105/396 |
| 5,601,034 | 2/1997 | Tao et al. | 105/423 |
| 5,664,826 | 9/1997 | Wilkens | 296/181 |
| 5,685,229 | 11/1997 | Ohara et al. | 105/397 |
| 5,784,970 | 7/1998 | Fehr et al. | 105/401 |

FOREIGN PATENT DOCUMENTS

| | | |
|---|---|---|
| 608 761 | 8/1994 | European Pat. Off. . |
| 622 285 | 11/1994 | European Pat. Off. . |

Primary Examiner—Carl D. Friedman
Assistant Examiner—Kevin D. Wilkens
Attorney, Agent, or Firm—Cohen, Pontani, Lieberman & Pavane

[57] ABSTRACT

In a construction featuring sections of light metal and light-weight composite panels joined to the sections the composite panels feature a plastic core with light weight metal outer sheets bonded to both sides. The outer sheets partially overlap a light metal connecting section which is integrally incorporated in the composite panel and interlock by virtue of fit with that section. The connecting section features connecting strips that lie as pairs on corresponding connecting strips on the section. At least one of the connecting strips is riveted to this neighboring strip. The connecting strip of the connecting section is inclined at an angle with respect to a contact plane in order to create pressure on the neighboring connecting strip, and is joined at its free edge by laser welding to the neighboring connecting strip.

11 Claims, 2 Drawing Sheets

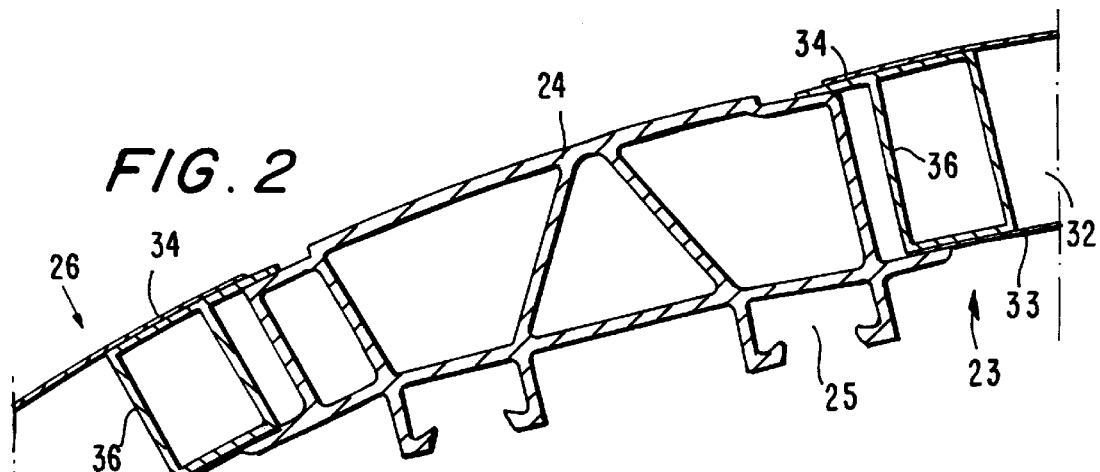
FIG. 2
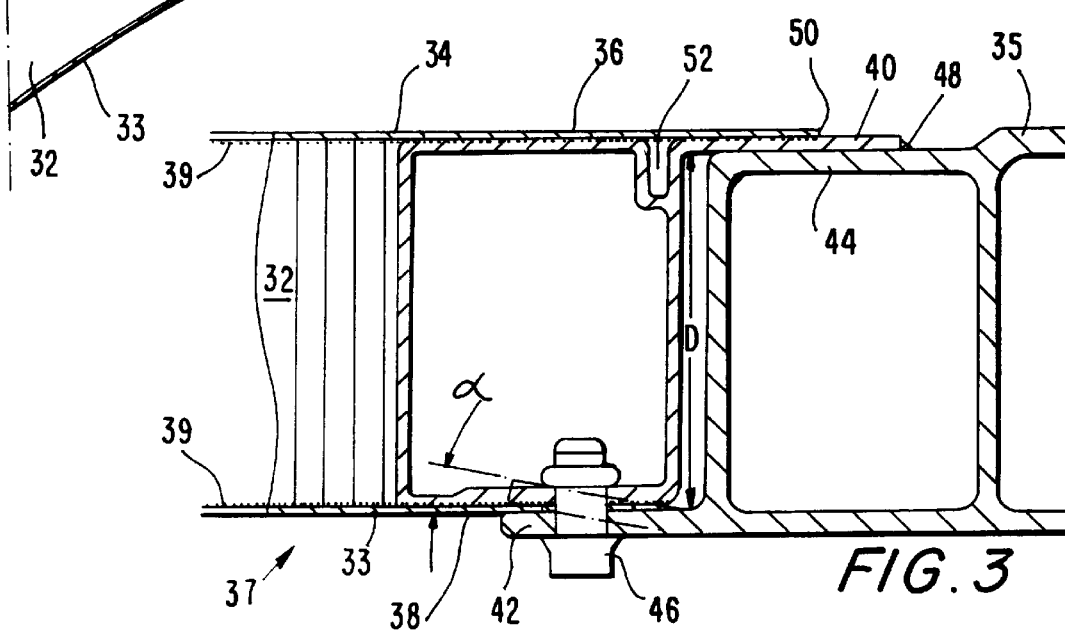
FIG. 3
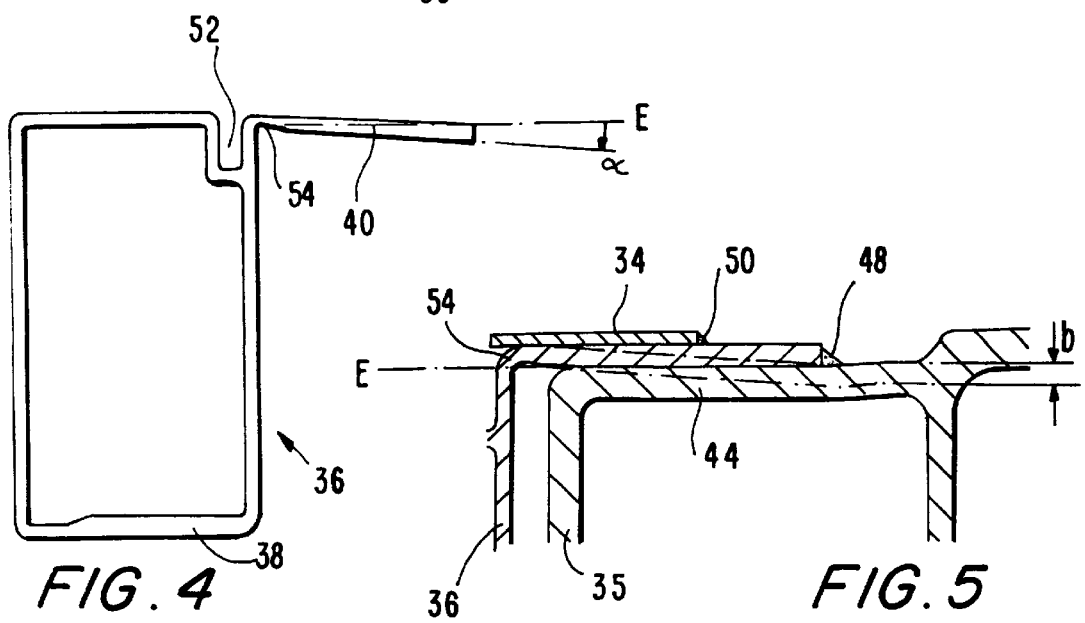
FIG. 4
FIG. 5

CONSTRUCTION USING EXTRUDED SECTIONS AND COMPOSITE PANELS

BACKGROUND OF THE INVENTION

1. Field of the Invention

The invention relates to a construction using extruded light metal sections and lightweight composite panels joined to the sections. Within the scope of the invention is also a use of the construction.

2. Discussion of the Prior Art

Carriage superstructures for high-speed trains have to meet high demands with respect to air tightness and stiffness under pressure, soundproofing and thermal insulation, performance during collision, weight, manufacture and assembly. Carriage superstructures of known forms of construction are not capable of meeting all of these requirements in every respect.

In a carriage superstructure of the kind described above and published in EP-A-0622285, the lightweight composite panels comprise a plastic core clad on both sides with outer layers of plastic. The connection between the composite panels and the longitudinal profiled beam sections is achieved by means of in intermediate section of aluminium which is bonded between the outer layers of the composite section and welded to the profiled beam section.

SUMMARY OF THE INVENTION

The object of the present invention is to provide a construction of the kind mentioned above which is characterised by low weight, a high degree of stiffness, and good fatigue strength. The construction should also be simple, cost favourable to produce and useable in many applications.

That objective is achieved by way of the invention in which,

- the composite panels feature a plastic core with light weight metal outer sheets bonded to both sides,
- the outer sheets partially overlap a light metal connecting section which is integrally incorporated in the composite panel and interlock by virtue of fit with that section,
- the connecting section features connecting strips that lie as pairs on corresponding connecting strips on the section,
- at least one of the connecting strips is joined mechanically to this neighbouring strip,
- at least one of the connecting strips of the section or of the connecting section is inclined at an angle with respect to a contact plane in order to create pressure on the neighbouring connecting strip, and
- the at least one prestressed strip is joined at its free edge by welding to the neighbouring connecting strip.

The mechanical joint between the two outer connecting strips is preferably a riveted joint, may however e.g. be a bolted or nailed joint.

The welding is preferably in the form of laser welding.

Basically it is possible to realize the joint between section and connecting section on both sides using laser welding. In practice, however, it has been found that, especially under the rough assembly conditions, it is not always possible to keep to the close laser welding tolerance limit of approx. 0.8 mm max. between the parts to be joined together, this especially in the case of long weld seams of several meters in length. Failure to do so means interrupting the automatic welding process. If, in accordance with the invention, the connection is made on one side by riveting, and on the other side the connecting strips are prestressed, then the tolerance specified for laser welding can be maintained also over large weld seam lengths.

Usefully, the design of the connecting strips is chosen such that, where the construction requires relatively large section thickness, the connection is made by riveting and, where the connecting strip has to produce just sufficient prestressing, that strip is appropriately thin or there is a local reduction in the thickness of the section.

In a specially preferred version of the construction according to the invention at least one of the outer sheets overlapping the prestressed connecting strip is joined by its free edge to the connecting strip by means of welding, in particular by means of laser welding. The outer sheets are usually much thinner than the section. In order to meet the tolerance limits for laser welding, it is sufficient therefore for the outer sheets to be pressed down by a roller during welding.

As the parts to be joined by laser welding have to be kept absolutely free of adhesive, the connecting section may, at least in the region of the prestressed connecting strip, exhibit a longitudinal groove which is U-shaped in cross-section and is bridged by the outer sheet.

Aluminium alloys are suitable as lightweight metal materials, however, magnesium or magnesium alloys may also be employed.

A specially preferred composite panel has a core of foamed polyetherimide and the outer sheets are of an AlMg alloy, in particular an alloy of the AlMg3 type.

The sections and/or the connecting sections may be e.g. of an extruded AlMgSi alloy.

The connecting section is preferably a hollow section.

The construction according to the invention is useable in many applications and is suitable in particular for manufacturing floor, wall and roof parts in above ground and below ground constructions, vehicle manufacture, shipbuilding or container manufacture.

Especially in the case of constructions used out of doors care is taken that the side with the laser weld—because of the water tightness—forms the outer face and the side with the rivet connection is on the inside where contact with water or another fluid can be avoided. The construction according to the invention allows, therefore, water-tight constructions to be manufactured, which in addition—because of the continuous metal contact throughout—in the case of box-like constructions form a Faraday cage.

BRIEF DESCRIPTION OF THE DRAWINGS

Further advantages, features and details of the invention are revealed in the following description of preferred exemplified embodiments and with the aid of the drawing which shows schematically in FIG. 1 is a cross-section through a carriage superstructure;

FIG. 2 is an enlarged part of the cross-section in FIG. 1 in the region of a connection;

FIG. 3 is a cross-section through a special version of a connection;

FIG. 4 is a cross-section through a connecting section; and

FIG. 5 is an enlarged view of the cross-section in FIG. 3 in the region of the laser weld.

DETAILED DESCRIPTION OF THE PREFERRED EMBODIMENT

Figure 1:
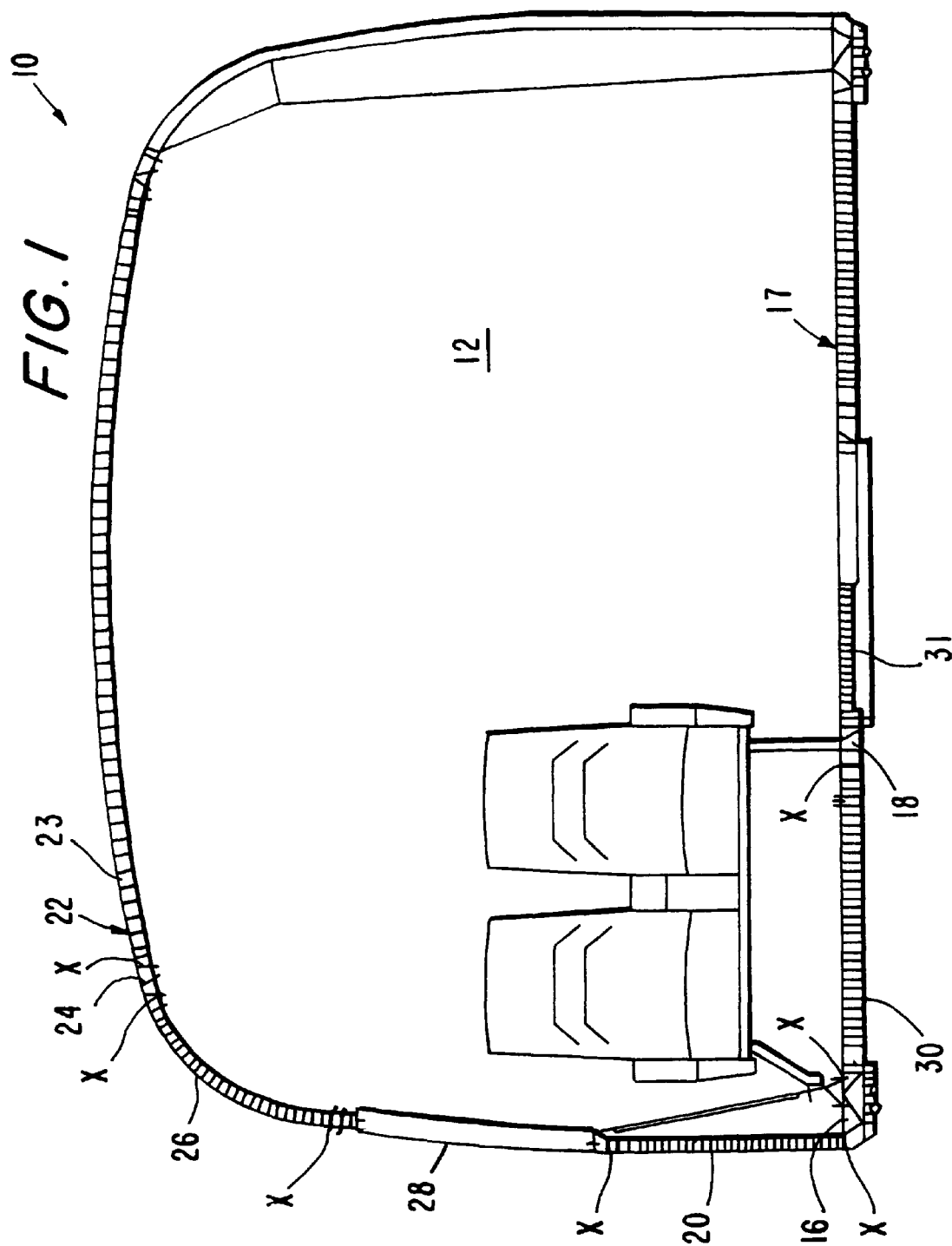

A carriage superstructure 10 of a magnetically levitated high speed train for passenger transport is shown in FIG. 1 and has a passenger compartment 12. The passenger compartment 12 is in the form of an aluminium light weight construction featuring a combination of sections and sandwich materials.

The passenger compartment 12 features a floor 17 delimited by two side beams 16. The floor is made up of two outer floor panels 30 situated between the side beams 16 and longitudinal beams 18, and an inner floor panel 31 situated between the two longitudinal beams 18.

Projecting up from the side beams 16 are sidewalls 20, which are connected via the window posts 28 to the roof 22.

The roof 22 comprises a main roof part 23 mounted between roof struts 24, and transition pieces 26 as connecting elements between the roof struts 24 and the window posts 28.

FIG. 2 shows the connection of the main roof part 23 and the transition piece 26 at the roof strut 24. The roof strut 24 is in the form of an extruded hollow section of an AlMgSi alloy. The main roof part 23 and the transition piece 26 are in the form of bent sandwich panels and feature a core 32 clad on both sides with outer sheets 33, 34. The core is made e.g. from foamed polyetherimide, the outer sheets of an alloy of the AlMg3 type.

The connection between the main roof part 23 and the roof strut 24 and between the transition piece 26 and the roof strut 24 is made via a hollow connecting section 36 which is integrally incorporated in the main roof part 23 and in the transition piece 26; the connecting section 36 is likewise made of an extruded alloy of the AlMgSi type. Integrally formed on the roof strut 24, facing towards the interior of the vehicle, are undercut grooves 25 that serve to support the roof section during assembly and as attachment means for the interior cladding.

Shown in FIG. 3 is the connection between the roof strut 24 and the transition piece 26 in FIG. 2, here shown in greater detail. To be seen in FIG. 3 is the essential core of invention viz., the connection between a sandwich panel 37 and a section 35. The foamed core 32 of the sandwich panel 37 is clad on both sides by the outer sheets 33, 34. The outer sheets 33, 34 overlap and, by virtue of shape, engage on the connecting section 36 which is in line with the surface of the core 32. The connection between the outer sheets 33, 34 and the core 32 and the connecting section 36 is made via an intermediate layer of adhesive 39.

The connecting section 36—integrated in the composite panel 37 for the purpose of joining up with a section—features a first integral connecting strip 38 and a second connecting strip 40 projecting from the connecting section 36. These connecting strips 38, 40 of the connecting section 36 lie on a connecting strip 42 projecting out from the section 35 and on an integral connecting strip 44 of the section 35 respectively. After installation, both connecting strips 38, 40 of the connecting section 36 run parallel to each other a distance D apart. This distance a corresponds to the distance between the parallel connecting strips 42, 44 on the section 35.

The connecting strip 42 of the section 35 rests against the connecting strip 38 of the connecting section 36 with the outer sheet 33 between them, and is attached to it by a rivet 46 that penetrates the connecting strips 38, 42. On the opposite side of the joint, the connecting strip 40 of the connecting section 36 rests against the connecting strip 44 of section 35. The free end of the connecting strip 40 projecting out from the connecting section 36 is joined to the connecting strip 44 of the section 35 by a main weld seam 48 made by laser welding.

The outer sheets 33, 34 partially overlap the connecting section 36. The free edges of an outer sheet 34 is joined to the underlying connecting strip 40 of the connecting section 36 by a weld seam 50 made by laser welding.

As it is essential that, during laser welding, adhesive is prevented from entering the weld zone, appropriate precautions must be taken in the region of the weld viz., between the outer sheet 34 and the underlying connecting section 36. Section 36 is absolutely free of adhesive in the edge region of the outer sheet 34; also an additional measure can be taken by special design of the connecting section 36 in the region of the weld seam 50. To this end the connecting section 36 features a longitudinal groove or, in cross-section, a U-shaped longitudinal groove 52 as a so-called trap for adhesive. On bonding the outer sheets 33, 34 to the core 32 under pressure any adhesive pushed out from the interface is then trapped in the groove 52 and cannot, therefore, enter the region where the weld seam 50 is formed. The weld seam 50 causes a gas tight connection to be made between the outer sheet 34 and the underlying connecting strip 40 of the connecting section 36. As a result, it is possible to prevent a reduction of the bonding between the outer sheet 34 and the core 32, even after many years of service.

As shown in FIG. 4, the connecting strip 40 projecting freely from the connecting section 36 is inclined at an angle α with respect to the contact plane E formed by the connecting strip 40 of the section 35. On joining the composite panel 37 to the section 35, the connection is made first via the riveted joint 46. For that reason, and as a result of the angle of inclination a of the connecting strip 40, that strip is—as shown in FIG. 5—prestressed by a distance b, viz., the distance that the strip 40 is deflected from its original position, shown by broken lines in FIG. 5. In order to set the amount of prestressing, there is a local reduction 54 in the thickness of the connecting strip 40. As shown in FIG. 3 is dashed lines, the connecting strip 42 of the section 35 can also be inclined with respect to the contact plane.

By prestressing the connecting strip 40 that strip is pressed against the underlying connecting strip 44 of the section 35, as a result of which the maximum permissible tolerance for laser welding can be satisfied even in the case of long lengths of main weld seam 48. At the same time, along with the main weld seam 48, it is possible to produce the weld seam 50 between the free end of the outer sheet 34 and the connecting strip 40—whereby it is sufficient here if the outer sheet 34 is pressed down by a roller during welding.

The method of joining shown in particular in FIG. 3 may in general be used everywhere a sandwich panel has to be joined to a section. In the case of the carriage superstructure 10 shown in FIG. 1 those places where the method of joining shown in FIG. 3 is used, are indicated by x. The other connections between the transition piece 26 and the window post 28, between the window posts 28 and the side wall 20, and between the longitudinal beams 18 and the inner floor panel 31 are only riveted.

The method of joining the sandwich panels and sections 35 described here enables the carriage superstructure 10 in FIG. 1 to be pre-fabricated in three parts and then assembled to the finished form by installing the window post sections 28 and the inner floor panel 31. Of course the method of joining the cross-section of a carriage superstructure 10 is also valid for joints in the longitudinal direction between the sandwich panels and intermediate transverse beams.

We claim:

1. A construction, comprising:

a main section of light metal, the main section having connecting strips;

a light-weight composite panel joined to the main section; and a light metal connecting section integrally incorporated in the composite panel, the composite panel having a plastic core with light metal outer sheets bonded to both sides of the core, the outer sheets being configured to partially overlap the light metal connecting section and interlock with the connecting section, the connecting section having connecting strips that lie as pairs on corresponding ones of the connecting strips of the main section, at least one of the connecting strips of the connecting section being mechanically joined to a neighbouring one of the connecting strips of the main section, at least one of the connecting strips of one of the main section and the connection section being inclined at an angle with respect to a contact plane so as to be prestressed and create pressure on a neighbouring connecting strip of an other of the main section and the connecting section, the at least one prestressed connecting strip having a free edge connected to the neighbouring connection strip by a weld.

2. A construction according to claim 1, wherein the weld is a laser beam weld.

3. A construction according to claim 1, wherein the connecting section has a U-shaped longitudinal groove in a region of the prestressed connecting strip, one of the outer sheets being configured to cover the groove.

4. A construction according to claim 1, wherein the core is a foamed polyetherimide (PEI).

5. A construction according to claim 1, wherein at least one of the connecting section and the main section is made of an extruded AlMgSi alloy.

6. A construction according to claim 1, wherein the connecting section is a hollow section.

7. A construction according to claim 1, wherein one of the outer sheets overlaps the prestressed connecting strip and has a free edge joined to the prestressed connecting strip by a weld.

8. A construction according to claim 7, wherein each weld is a laser weld.

9. A construction according to claim 1, wherein the outer sheets are made of an AlMg alloy.

10. A constructing according to claim 9, wherein the outer sheets are made of an AlMg3 type alloy.

11. A process for manufacturing a construction, comprising the steps of:

providing a main section of light metal, the main section having connecting strips;

providing a light-weight composite panel having a plastic core with light metal outer sheets bonded to the sides of the core and a light metal connecting section integrally incorporated in the composite panel, the connecting section having connecting strips, the outer sheets partially overlapping the connecting section and interlocking with the connecting section; and joining the composite panel to the main section so that the connecting strips of the connecting section lie as pairs on corresponding ones of the connecting strips of the main section, the joining step including mechanically joining at least one of the connecting strips of the connecting section to a neighboring connecting strip of the main section, at least one of the connecting strips of one of the main section and the connecting section being inclined at an angle with respect to a contact plane so as to be prestressed and to create pressure on a neighbouring connecting strip of an other of the main section and the connecting section, the joining step further including welding a free edge of the prestressed connecting strip to the neighboring connecting strip.

* * * * *